United States Patent
Frye et al.

(10) Patent No.: US 8,666,464 B2
(45) Date of Patent: Mar. 4, 2014

(54) VEHICLE INTERIOR COMPONENT FOR SUPPORTING A COMMUNICATION SYSTEM

(75) Inventors: Mark S. Frye, Grosse Pointe Woods, MI (US); Lawrence D. Cepuran, Northville, MI (US); Steven Swanson, Commerce Township, MI (US); Charles A. Everhart, Canton, MI (US)

(73) Assignee: General Motors LLC, Detroit, MI (US)

( * ) Notice: Subject to any disclaimer, the term of this patent is extended or adjusted under 35 U.S.C. 154(b) by 148 days.

(21) Appl. No.: 13/430,406

(22) Filed: Mar. 26, 2012

(65) Prior Publication Data

US 2013/0252680 A1    Sep. 26, 2013

(51) Int. Cl.
*H04M 1/00* (2006.01)

(52) U.S. Cl.
USPC .................................. 455/575.9; 455/569.2

(58) Field of Classification Search
USPC ........ 455/569.2, 569.1, 41.2, 575.9; 379/441, 379/446
See application file for complete search history.

(56) References Cited

U.S. PATENT DOCUMENTS

| | | | |
|---|---|---|---|
| 4,870,676 A * | 9/1989 | Lewo ............................. | 455/564 |
| 5,535,274 A | 7/1996 | Braitberg et al. | |
| 6,236,868 B1 * | 5/2001 | Lygas .......................... | 455/569.2 |
| D466,061 S * | 11/2002 | Samora, Jr. .................. | D12/191 |
| 7,236,355 B2 * | 6/2007 | Kim ........................... | 361/679.15 |
| D554,569 S * | 11/2007 | Kolenda ....................... | D12/191 |
| 8,099,054 B2 * | 1/2012 | Tabe ............................. | 455/63.1 |

OTHER PUBLICATIONS

Watkins, Gary A. et al., Enhanced Smartphone In-Vehicle Accommodation, U.S. Appl. No. 13/178,039, filed Jul. 7, 2011.

\* cited by examiner

*Primary Examiner* — Sonny Trinh
(74) *Attorney, Agent, or Firm* — Ingrassia Fisher & Lorenz, P.C.

(57) ABSTRACT

An vehicle interior component for supporting a communication system is disclosed herein. The vehicle interior component includes, but is not limited to, a body that is adapted for attachment to an interior of the vehicle and that is configured to receive a smartphone. The vehicle interior component further includes a hardware module that is configured to communicatively couple with the smartphone. The vehicle interior component still further includes a user input module communicatively coupled with the hardware module. The user input module is configured to generate a first input signal in response to a first user input and to transmit the first input signal to the hardware module. The hardware module is further configured to generate a first output signal and to transmit the first output signal to the smartphone in response to receiving the first input signal.

17 Claims, 10 Drawing Sheets

VEHICLE INTERIOR COMPONENT FOR SUPPORTING A COMMUNICATION SYSTEM

TECHNICAL FIELD

The technical field generally relates to vehicles, and more particularly relates to a vehicle interior component for supporting a communication system.

BACKGROUND

Telematics services are services that are provided by a call center to a vehicle and/or to the operator of a vehicle that relate to various needs of the vehicle or the operator. Telematics services commonly include, but are not limited to, the remote monitoring of vehicle maintenance needs, the provision of turn by turn navigation guidance, and the coordination of emergency services during vehicle emergencies, to name just a few.

A telematics service system includes a telematics unit that is located with the vehicle, a call center that is located remotely from the vehicle, and a communication network that communicatively connects the two. Historically, the telematics unit has been embedded in the vehicle (i.e., mounted to the vehicle during vehicle assembly) and therefore available to the operator throughout the operator's ownership of the vehicle.

Over the past several years, smartphones have increasingly become available in the marketplace. A smartphone is a cell phone that includes additional functions including, but not limited to e-mail service and Internet web browsing. Many smartphone are also capable of running software applications commonly known as Apps. Some Apps are designed to allow a smartphone to function as a telematics unit and to engage with the communication networks that are utilized by existing telematics systems. Accordingly, a smartphone loaded with, and running an appropriate App can be used by owners of vehicles to procure some or all of the available telematics services.

Conventional vehicles, however, are generally not configured to allow easy integration (e.g., physical and communicative coupling) of a smartphone into the vehicle. Accordingly, a vehicle owner who attempts to use his or her smartphone as a telematics unit will commonly lay the smartphone on an interior surface of the passenger compartment in a position that is accessible to the owner to allow the owner to utilize the telematics services and other features of the smartphone. Frequently, this entails the smartphone resting untethered and unrestrained on a smooth interior surface of the vehicle where it may be free to move in response to the dynamic forces encountered during normal vehicle operations. Some consumers may find this arrangement undesirable.

Accordingly, it is desirable to provide a component that facilitates integration of the smartphone into the interior of a vehicle. In addition, it is desirable to provide a component that facilitates a user's ability to utilize his or her smartphone as a telematics unit. Furthermore, other desirable features and characteristics will become apparent from the subsequent detailed description and the appended claims, taken in conjunction with the accompanying drawings and the foregoing technical field and background.

SUMMARY

A vehicle interior component for supporting a communication system is disclosed herein.

In a first non-limiting example, the vehicle interior component includes, but is not limited to, a body that is adapted for attachment to an interior of the vehicle and that is configured to receive a smartphone. The body comprises a sun visor assembly. The vehicle interior component further includes, but is not limited to, a hardware module that is configured to communicatively couple with the smartphone when the smartphone is received by the body. The vehicle interior component further includes, but is not limited to, a user input module that is communicatively coupled with the hardware module. The user input module is configured to generate a first input signal in response to a first user input and to transmit the first input signal to the hardware module. The hardware module is further configured to generate a first output signal and to transmit the first output signal to the smartphone in response to receiving the first input signal.

In another non-limiting example, the vehicle interior component includes, but is not limited to, a body that is adapted for attachment to an interior of the vehicle and configured to receive a smartphone. The body comprises a sun visor assembly. The vehicle interior component further includes, but is not limited to, a hardware module that is configured to communicatively couple with the smartphone when the smartphone is received by the body. The vehicle interior component further includes, but is not limited to, a user input module that is communicatively coupled with the hardware module. The user input module is configured to generate a first input signal in response to a first user input and to transmit the first input signal to the hardware module. The vehicle interior component still further includes, but is not limited to, a vehicle bus communication module that is communicatively coupled with the hardware module and that is configured to communicatively couple with a vehicle bus of the vehicle and further configured to communicatively interface between the hardware module and the vehicle bus. The hardware module is further configured to generate a first output signal and to transmit the first output signal to the smartphone in response to receiving the first input signal.

In another non-limiting example, the vehicle interior component includes, but is not limited to, a sleeve that is configured to receive a smartphone. The vehicle interior component further includes, but is not limited to, a body that is adapted for attachment to an interior of the vehicle and that is configured to receive the sleeve. The body comprises a sun visor assembly. The vehicle interior component further includes, but is not limited to, a hardware module that is configured to communicatively couple with the smartphone when the smartphone is received by the sleeve and when the sleeve is received by the body. The vehicle interior component still further includes, but is not limited to, a user input module that is communicatively coupled with the hardware module. The user input module is configured to generate a first input signal in response to a first user input and to transmit the first input signal to the hardware module. The hardware module is further configured to generate a first output signal and to transmit the first output signal to the smartphone in response to receiving the first input signal.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

A vehicle interior component is disclosed herein that is configured to receive and couple with a smartphone and that is further configured to facilitate an operator's usage of the smartphone while docked with the vehicle interior component. In some examples, the vehicle operator may use the smartphone as a telematics unit. In an example, the vehicle interior component is configured as a sun visor having a docking port that is configured to receive a smartphone.

In some examples, the smartphone may be configured to function as a telematics unit. Thus, in an example, the sun visor is configured to permit an operator to interact with a smartphone that is docked in the sun visor in a manner similar to the manner in which an operator conventionally interacts with a telematics unit in a vehicle equipped with an embedded telematics unit. In an example, the sun visor includes a docking port that is configured to receive a smartphone, a user input module that is configured to facilitate interaction between an operator in the smartphone, a vehicle bus communication module that is configured to facilitate communication between the smartphone and a vehicle bus of the vehicle, and a hardware module that is configured to communicatively couple with the smartphone and each of the other components, and further configured to serve as an interface between the smartphone, on the one hand, and each of the other components on the other hand.

In an example, an operator wishing to utilize a telematics service may provide an input into the user input module, such as by depressing a button that corresponds with the desired telematics service. In response, the user input module will communicate the operator's request to the hardware module which will, in turn, forward the operator's request to the smartphone. The smartphone, which is programmed with an App that permits the smartphone to function as a telematics unit, will receive the communication from the hardware module and will respond in a manner that corresponds with the request.

In some instances, the smartphone may initiate contact with an external agency such as a remotely located call-center. In other instances, the smartphone may need to communicate with the vehicle bus in order to comply with the operator's request. When communication with the vehicle bus is needed, the smartphone will send an appropriate command to the hardware module. The hardware module, in response, will send a command to the vehicle bus communication module that will, in turn, transmit a message across the vehicle bus. A response received by the vehicle bus communication module from another vehicle component connected to the vehicle bus will be transmitted to the hardware module and on to the smartphone for further action.

In another example, an operator may wish to utilize a function of the smartphone other than those associated with telematics services. For example, an operator may wish to display a movie or other content on a vehicle's entertainment system that is stored in the smartphone. In such an example, the operator may depress a different button on the user input module that corresponds with activation of other functions of the smartphone (in some configurations, the operator may then speak aloud an appropriate voice command in order to access the desired content on the smartphone). The user input module will forward such a request to the hardware module which, in turn, communicates with the smartphone. Upon receipt of such request, the smartphone may initiate communication with the vehicle's entertainment system by transmitting one or more appropriate messages to the hardware module which will communicate with the vehicle bus communication module. The vehicle bus communication module will, in turn, transmit an appropriate message(s) to an appropriate component of the vehicle's entertainment system across the vehicle bus that will permit occupants of the vehicle to experience the desired content.

A greater understanding of the examples of the vehicle interior component for supporting a communication system disclosed herein may be obtained through a review of the illustrations accompanying this application together with a review of the detailed description that follows.

Figure 1:
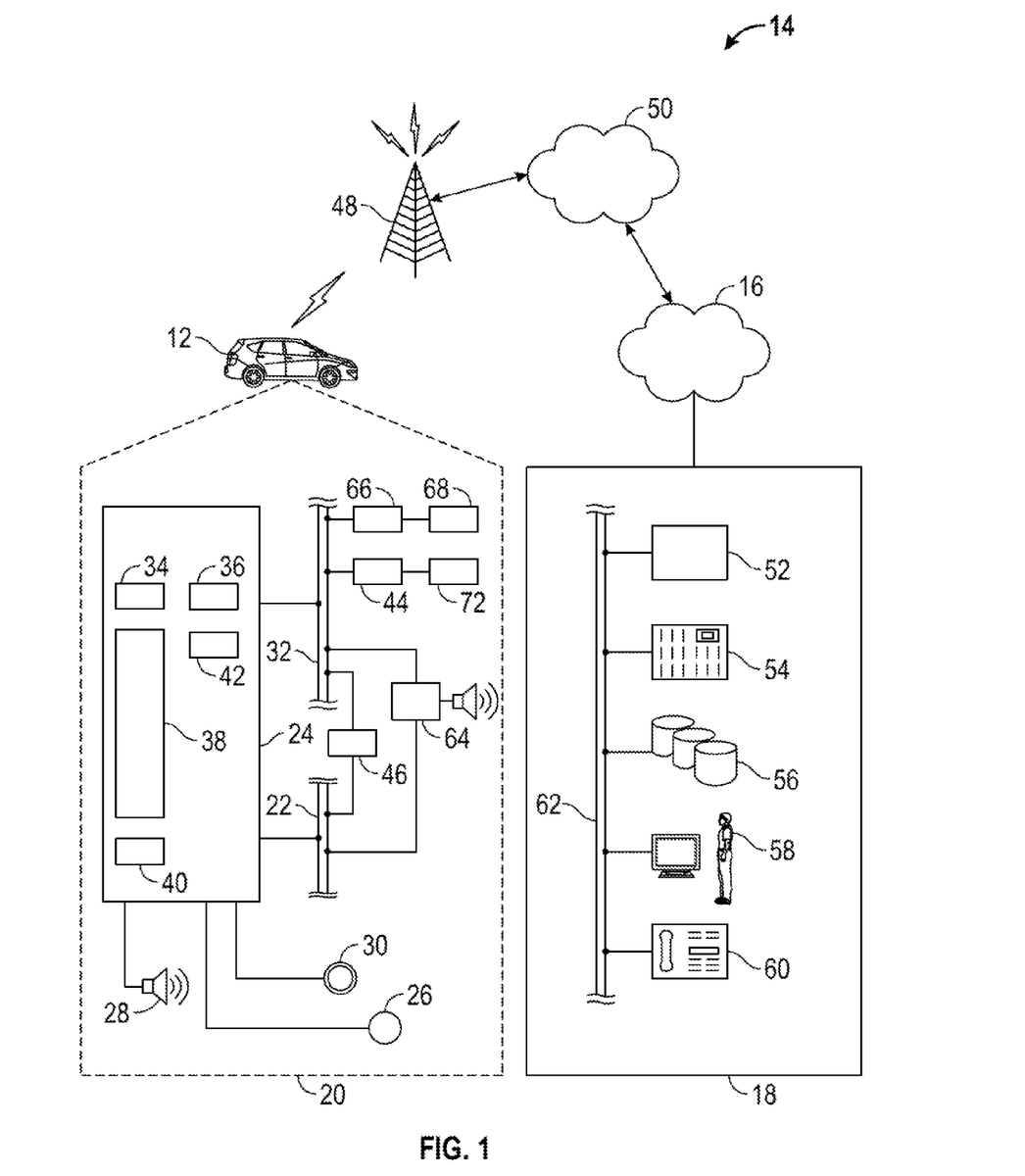
FIG. 1 is a schematic view illustrating a non-limiting example of a telematics service system that is compatible for use with examples of the vehicle interior component disclosed herein.

With reference to FIG. 1, there is shown a non-limiting example of a communication system 10 that may be used together with examples of the vehicle interior component disclosed herein. Communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within processing device 38. Telematics unit 24 can be replaced in whole or in part by a smartphone, as discussed below in detail.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. It should be understood that successful data transmission can be performed by other devices as well, such as through the use of a smartphone, as discussed below. Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The functions served by these components could also be served by the microphone and the speaker of a smartphone. The vehicle hardware also includes one or more buttons and/or controls 30 for enabling a vehicle occupant to activate or engage one or more of the components of the vehicle hardware 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a call center 18 that is manned, it will be appreciated that the call center 18 can be any central or remote facility, manned or unmanned, mobile or fixed, to or from which it is desirable to exchange voice and data.

Figure 2:
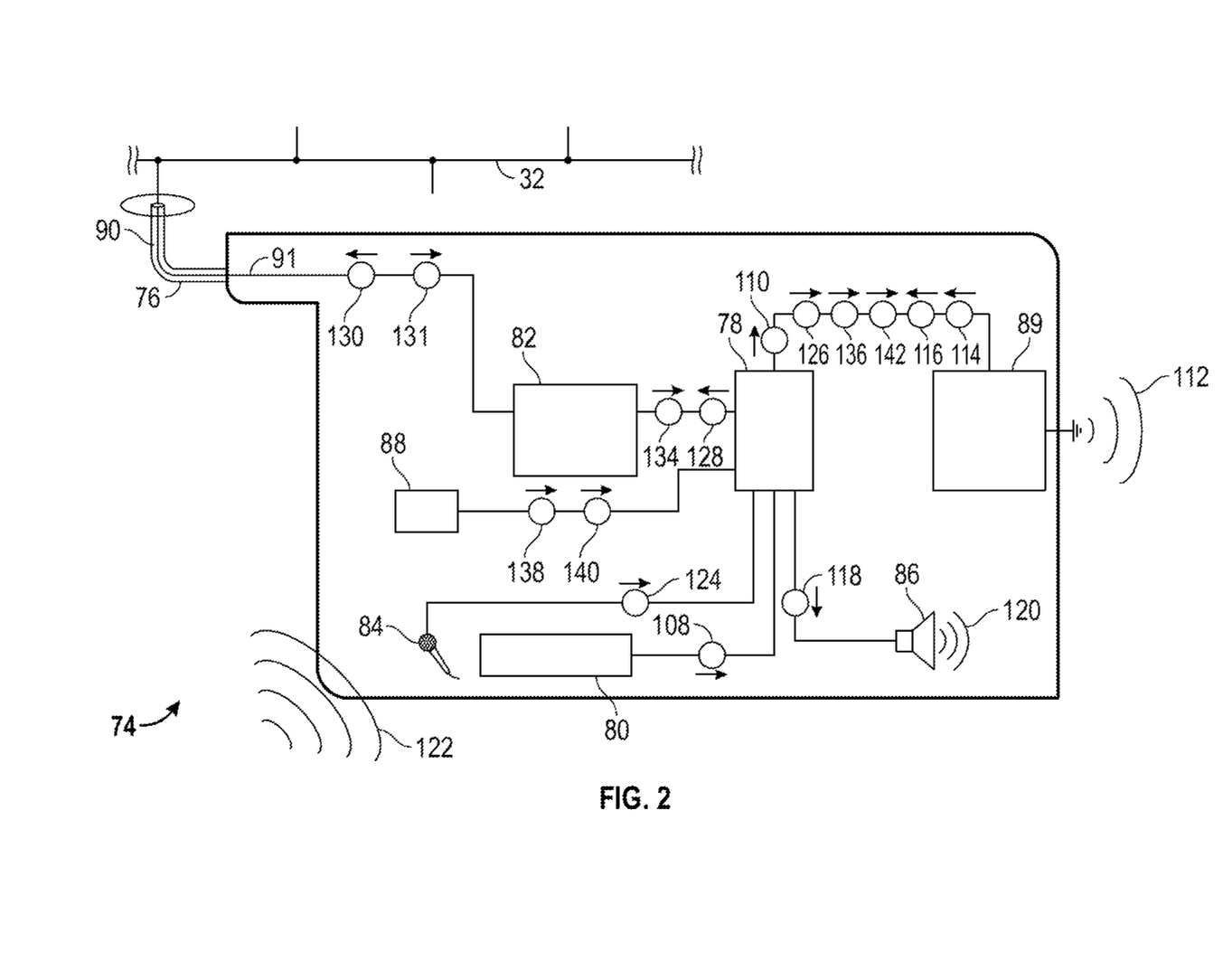
FIG. 2 is a schematic view illustrating a non-limiting example of a vehicle interior component made in accordance with the teachings of the present disclosure.

FIG. 2 is a schematic view illustrating a non-limiting example of a vehicle interior component 74 made in accordance with the teachings of the present disclosure. In the illustrated example, vehicle interior component 74 includes a mounting bracket 76, a hardware module 78, a user input module 80, a vehicle bus communication module 82, a microphone 84, a speaker 86, and an orientation sensor 88. In other examples, vehicle interior component 74 may include either fewer components or a greater number of components without departing from the teachings of the present disclosure. Vehicle interior component 74 is further configured to receive and to communicatively couple with smartphone 89. In some examples, smartphone 89 may be programmed and/or otherwise configured to function as a telematics unit. In such examples, when vehicle interior component 74 is communicatively coupled with smartphone 89, vehicle interior component 74 may serve substantially the same function as that served by telematics unit 24 of system 10, discussed above with respect to FIG. 1. Smartphone 89 inherently provides the ability to communicate with cell towers 48 of wireless carrier system 14 (see FIG. 1), while vehicle interior component 74 enables smartphone 89 to communicate with vehicle bus 32.

In the illustrated example, vehicle interior component 74 is configured as a sun visor. It should be understood that in other examples, vehicle interior component 74 may be configured as any other suitable interior component of a vehicle without departing from the teachings of the present disclosure. It should be further understood that vehicle interior component 74 may include additional components that are typically included on a sun visor such as, but not limited to, a vanity mirror, a mirror cover, and a light. These additional sun visor components have been omitted from the illustrations of the present disclosure for the purpose of simplifying the illustrations.

Mounting bracket 76 is configured to permit vehicle interior component 74 to attach to an interior surface of a vehicle in a manner that enables vehicle interior component 74 to pivot between a retracted and a deployed position. This configuration will allow a vehicle operator to use vehicle interior component 74 to shield his or her eyes from the sun or other light source as desired. In other examples wherein vehicle interior component 74 is configured as something other than a sun visor, mounting bracket 76 may be configured to mount vehicle interior component 74 to the vehicle in a stationary position.

Mounting bracket 76 includes an interior channel 90 through which a wire may be routed to carry electronic signals between vehicle bus 32 and vehicle interior component 74. In some examples, wire 91 may also be configured to deliver electric power to vehicle interior component 74 while in other examples, a separate wire (not shown) may be routed through interior channel 90 to deliver electric power to vehicle interior component 74.

Hardware module 78 is configured to serve as an interface between smartphone 89 and vehicle interior component 74. Hardware module 78 is illustrated in greater detail in FIG. 3.

Figure 3:
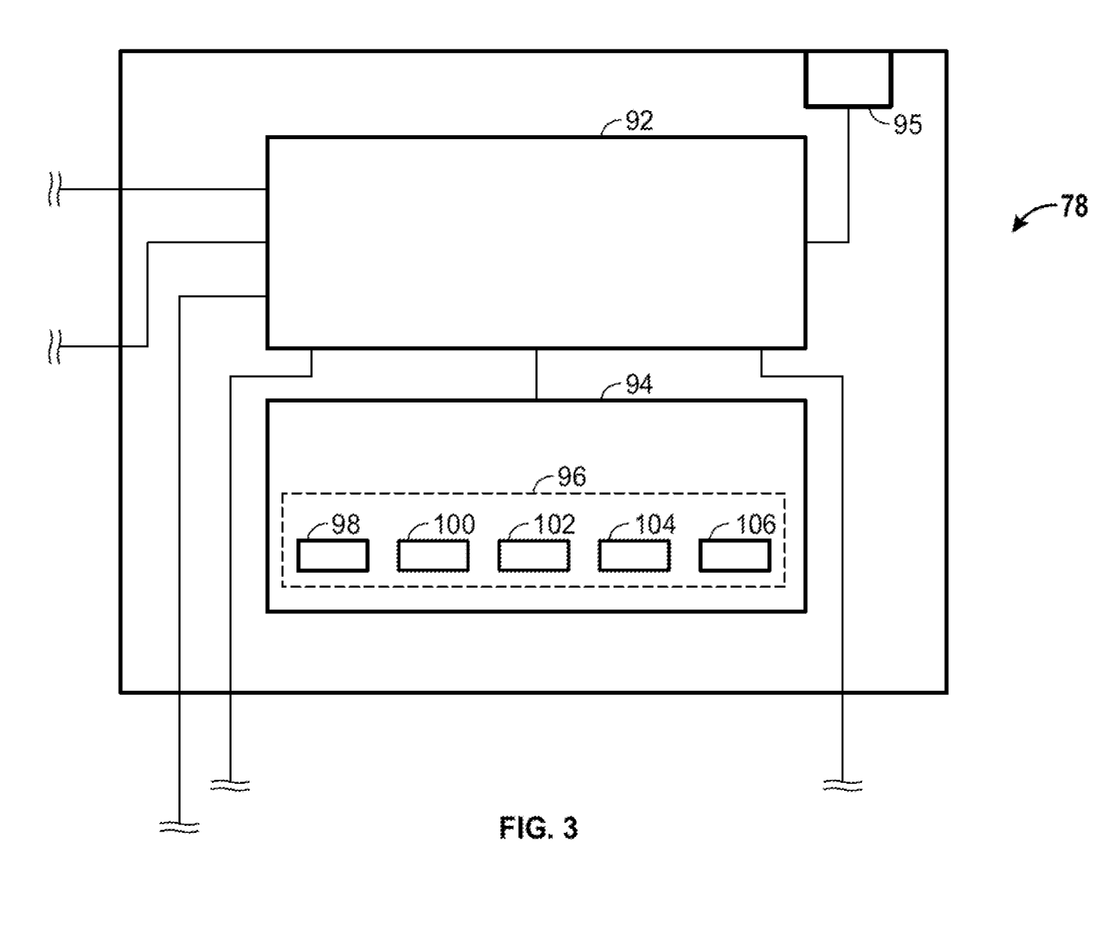
FIG. 3 is a schematic view illustrating a non-limiting example of a hardware module for use with the vehicle interior component of FIG. 2.

As illustrated in FIG. 3, hardware module 78 includes a processor 92, an electronic data storage unit 94, and a smartphone interface port 95. Processor 92 is operatively coupled with electronic data storage unit 94 and operatively coupled with smartphone interface port 95.

Processor 92 may be any type of computer, computer system, or microprocessor known in the art that is configured to perform algorithms, to execute software applications, to execute sub-routines and/or to be loaded with, and to execute, any other type of computer program.

Electronic data storage unit 94 may be any suitable type of electronic memory device that is configured to store data. Electronic data storage unit 94 may be any type of data storage component including, but not limited to, non-volatile memory, disk drives, tape drives, and mass storage devices. Electronic data storage unit 94 may include and may be configured to execute any suitable software, algorithm and/or sub-routine that provides electronic data storage unit 94 with the capability to store, organize, and permit retrieval of data.

With continuing reference to FIGS. 1-3, smartphone interface port 95 may comprise any structure or device that is configured to facilitate communicative coupling with smartphone 89. For example, and without limitation, smartphone interface port 95 may comprise a USB port, a multi-pin port, or any other type of port that is effective to physically engage, and to effect communicative coupling with, smartphone 89. In some examples, instead of being configured to provide a physical connection to smartphone 89, smartphone interface port 95, may comprise a wireless transceiver to facilitate wireless communications between smartphone 89 and hardware module 78.

Processor 92 is configured to receive input signals from other components of vehicle interior component 74 and to receive input signals from smartphone 89, and to generate and transmit output signals in response to such input signals. In the illustrated example, electronic data storage unit 94 is configured to store data 96 which includes a datum 98, datum 100, datum 102, datum 104, and datum 106. In other examples, data 96 may include either more or fewer datum. Datum 98, 100, 102, 104, and 106 each relate to a specific output signal generated by hardware module in response to a corresponding input signal. When hardware module 78 receives an input signal, the input signal is delivered to processor 92. In response to receiving the input signal, processor 92 is configured retrieve a corresponding datum from electronic data storage unit 94 and to generate an appropriate output signal using such datum.

In some examples, hardware module 78 may not include electronic data storage unit 94. In such examples, all appropriate responses to all incoming input signals may be preprogrammed into ROM stored in processor 92 or otherwise hardwired into processor 92.

With continuing reference to FIGS. 2 and 3, user input module 80 may comprise any component suitable to receive inputs from a human operator. For example, and without limitation, user input module 80 may be a keyboard, a mouse, a touch screen, a tablet and stylus, a button, a switch, a knob, a slide, a microphone, a camera, a motion detector, or any other device that is configured to permit a human to provide inputs into an electronic system.

User input module 80 is communicatively coupled with hardware module 78. Such communicative coupling may be achieved via any suitable means known in the art for conveying signals between user input module 80 and hardware module 78. Such communicative coupling may be accomplished through either a hardwired connection, through a wireless connection, or through a combination thereof.

In the illustrated example, user input module 80 is configured to facilitate an operator's use of telematics services provided by smartphone 89 when smartphone 89 is configured to function as a telematics unit. For example, user input module 80 may include a button that corresponds with telematics services that are typically provided by a call center such as call center 18 of telematics services to 10 illustrated in FIG. 1. Accordingly, an operator actuating user input module 80 may be connected to call center 18. User input module 80 may be further configured to facilitate an operator's use of one or more of the features of smartphone 89 that are unrelated to the provision of telematics services. In this manner, the user input module 80 facilitates an operator's ability to obtain the full range of features and services provided by smartphone 89 without having to physically handle smartphone 89. In an example, after an operator actuates user input module 80, the operator may interact with smartphone 89 via voice commands When user input module 80 receives a user input, such as a button press, user input module 80 is configured to generate a signal 108 that corresponds with the user input and is further configured to transmit signal 108 to hardware module 78. Upon receipt of signal 108 from user input module 80, hardware module 78 is configured to generate a signal 110. For example, in response to receiving signal 108 from user input module 80, processor 92 may transmit a command to electronic data storage unit 94 to retrieve datum 98. In this example, datum 98 may have been selected because datum 98 may correspond with signal 108. Upon receipt of datum 98, processor 92 may utilize datum 98 to generate signal 110. Processor 92 is further configured to command smartphone interface port 95 to transmit signal 110 to smartphone 89. In this manner, hardware module 78 is configured to transmit signal 110 to smartphone 89 in response to receiving signal 108. Upon receipt of signal 110, smartphone 89 is configured to interpret signal 110 to determine the operator's request for service.

In an example, the request for service may require smartphone 89 to interact with call center 18. For example, the input provided by the human operator may correspond with a request by the human operator to initiate communication with call center 18. In this example, smartphone 89 will generate a signal 112 and will transmit signal 112 to call center 18. Smartphone 89 will interact with call center 18 in the manner described in detail above with respect to telematics service system 10 and illustrated in FIG. 1. Upon receiving instructions from call center 18, smartphone 89 is configured to generate and deliver a signal 114 to hardware module 78 for further action that may be necessary to carry out the human operator's request for service.

In another example, the request for service may require further action by smartphone 89 alone without requiring any involvement by call center 18. For example, the input provided by the human operator may correspond with a request by the human operator to access content stored on smartphone 89 (e.g., music). In this example, smartphone 89 will respond directly to signal 110 by generating an appropriate signal 116 by transmitting signal 116 to hardware module 78 for further action that may be necessary to carry out the human operator's request for service.

Speaker 86 may be any suitable component that is configured to emit audible sounds in response to receiving an electronic signal corresponding with a desired sound. In the illustrated example, speaker 86 is communicatively coupled with hardware module 78. Accordingly, through the provision of appropriate electronic signals to speaker 86, hardware module 78 can control the sounds that are emitted by speaker 86. In an example where the human operator is seeking to initiate voice communications with call center 18, signal 114 may correspond with a voice message generated and transmitted by call center 18. Thus, in response to receiving signal 114, hardware module 78 may generate and transmit signal 118. In response to receiving signal 118, speaker 86 may generate audible sound 120 which will be detected by the human operator. In other examples, a speaker inherent to smartphone 89 may serve this function instead of speaker 86.

Microphone 84 may be any component suitable to detect audible sounds, to generate an electronic signal corresponding to the detected audible sound, and to transmit such an electronic signal. In the illustrated example, microphone 84 is communicatively coupled with hardware module 78. When microphone 84 is actuated and detects an audible sound 122, microphone 84 is configured to generate a signal 124 and to transmit signal 124 to hardware module 78. In the example where the human operator is seeking to initiate voice communications with call center 18, after hearing audible sound 120, the human operator may speak and produce audible sound 122 which will be detected by microphone 84. In response, microphone 84 will generate and transmit signal 124 to hardware module 78. In response to receiving signal 124 from microphone 84, hardware module 78 may generate signal 126 which is transmitted to smartphone 89. In response to receiving signal 126, smartphone 89 will transmit signal 112 to call center 18 and thereby effect the transmission of the human operator's voice message to call center 18. In this manner, through the use of user input module 80, a human operator may initiate voice communications with call center 18 and through the use of microphone 84, speaker 86, hardware module 78, and smartphone 89, the human operator may engage in voice communications with call center 18. In other examples, a microphone inherent to smartphone 89 may serve this function instead of microphone 84.

Vehicle bus communication module 82 may comprise any component that is suitable to serve as an interface between hardware module 78 and vehicle bus 32. Vehicle bus communication module 82 is configured to receive a signal generated by hardware module 78, to convert the signal into a message that is capable of being interpreted by a target vehicle component communicatively coupled with vehicle bus 32 and to transmit a signal containing such message over vehicle bus 32 to the target vehicle component. Vehicle bus communication module 82 is further configured to receive a signal from the vehicle component that is communicatively coupled to vehicle bus 32, to convert the message contained within the signal into a message that is capable of being interpreted by hardware module 78 and to generate and transmit a signal the hardware module 78 containing such interpretable message. Vehicle bus communication modules are known in the art. An exemplary vehicle bus communication module is manufactured by DGE Inc, sold under the trade name OBD-II Vehicle Bus Interface, and has the model number OBD-II VBI.

In an example where the human operator provided an input into user input module 80 that related to the provision of telematics services and where the provision of such telematics services requires information that resides in another vehicle component that is communicatively coupled to vehicle bus 32 (e.g., remote monitoring of vehicle maintenance needs), signal 116 may instruct hardware module 78 to obtain the needed information from the other vehicle component. In such an example, hardware module 78 will generate and transmit a signal 128 to vehicle bus communication module 82 instructing vehicle bus communication module 82 to obtain such information from the other vehicle component.

In response, vehicle bus communication module 82 will generate a signal 130 containing a message that is capable of being interpreted by the other vehicle component. Vehicle bus communication module 82 will then transmit signal 130 across vehicle bus 32 to the other vehicle component. In response to receiving signal 130, the other vehicle component will generate and transmit a signal 132 to vehicle bus communication module 82 containing a message that includes the requested information. In response to receiving signal 132, vehicle bus communication module 82 is configured to interpret the message contained therein, to convert the message into a message that is capable of being interpreted by hardware module 78, to generate a signal 134 containing that message, and to transmit signal 134 to hardware module 78. In response to receiving signal 134, hardware module 78 is configured to generate a signal 136 that contains the information requested by smartphone 89 and to transmit signal 136 to smartphone 89. Smartphone 89 is configured to utilize the requested information to respond to the human operator's request for service.

Orientation sensor 88 may be any device that is capable of detecting the orientation of vehicle interior component 74. In an example, orientation sensor 88 may be configured to detect when vehicle interior component 74 is in an up or retracted position (i.e., flush against a ceiling or headliner of a vehicle) and to detect when vehicle interior component 74 is in a deployed position (i.e., moved away from the retracted position). Information indicating whether vehicle interior component 74 is in a retracted or a deployed state may be utilized by smartphone 89 to determine which services may be made available to a human operator. For example, if vehicle interior component 74 is in the retracted position, smartphone 89 may not be visible to the human operator and therefore the video screen of smartphone 89 may be deactivated and features of smartphone 89 which are ordinarily actuated through engagement with the video screen may be disabled. Conversely, if vehicle interior component is in the deployed position, smartphone 89 may be visible to the human operator and therefore the video screen of smartphone 89 may be activated and features of smartphone 89 which are ordinarily actuated through engagement with the video screen may be enabled.

Orientation sensor 88 is communicatively coupled with hardware module 78. Orientation sensor 88 is configured to generate a signal corresponding with the detected orientation of the vehicle interior component 74 and to transmit that signal to hardware module 78. For example, if vehicle interior component 74 is in the retracted position, orientation sensor 88 may be configured to generate signal 138 containing information indicative of vehicle interior component 74 being in the retracted position. If vehicle interior component is in the deployed position, orientation sensor 88 may be configured to generate signal 140 containing information indicative of the vehicle interior components of before being in the deployed position. Orientation sensor 88 is further configured to transmit signals 138 and 142 hardware module 78. In response to receiving signal 138 or signal 140, hardware module 78 is configured to generate a signal 142 containing information indicative of the orientation of vehicle interior component 74 and to transmit signal 142 to smartphone 89. In other examples, an accelerometer inherent to smartphone 89 may serve this function instead of orientation sensor 88.

In response to receiving signal 142, smartphone 89 will make a determination regarding which services and features to make available to a human operator. In addition smartphone 89 may be equipped with a GPS chipset or other capability that enables smartphone 89 to detect when the vehicle in which smartphone 89 is mounted is moving. Smartphone 89 may be configured to refrain from providing some or all smartphone-features to the human operator while the vehicle is in motion. Accordingly, smartphone 89 may be configured to utilize both the information that is contained in signal 142 and also the motion status of the vehicle as detected by smartphone 89 when determining which features and services to make available to human operator.

Smartphones come in a wide variety of shapes and sizes. Additionally, each new generation or version of smartphone commonly gives rise to a new physical configuration. Accordingly, it is desirable to provide vehicle interior component 74 with the capability to accommodate smartphones having a variety of different external configurations. This capability is illustrated in FIGS. 4-10.

Figure 4:
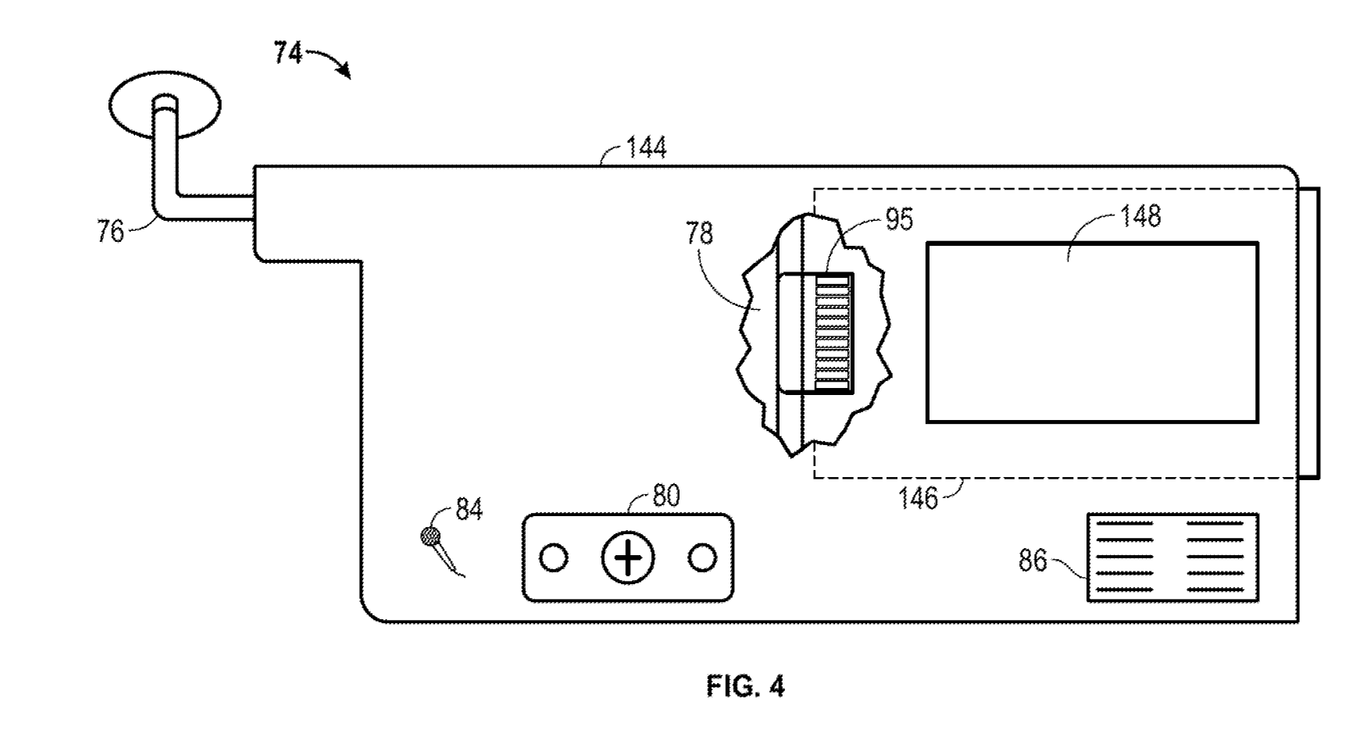
FIG. 4 is a cut-away view illustrating a non-limiting example of a vehicle interior component made in accordance with the teachings of the present disclosure prior to coupling with a smartphone.

FIG. 4 illustrates vehicle interior component 74 in a deployed position. In the illustrated example, vehicle interior component 74 comprises a sun visor 144. Sun visor 144 includes a recess 146, depicted in phantom lines, that is configured to accommodate a body such as a smartphone. In the illustrated example, recess 146 is defined within sun visor 144 so as to be large enough to accommodate the largest sized smartphone available in the marketplace. Sun visor 144 also includes a window 148 that is positioned adjacent recess 146 and that will provide visual access to a smartphone when the smartphone is positioned within recess 146. Configured in this manner, when sun visor 144 is in the deployed position, a smartphone received within recessed 146 (not shown in FIG. 4) will be visibly presented to the human operator.

Figure 5:
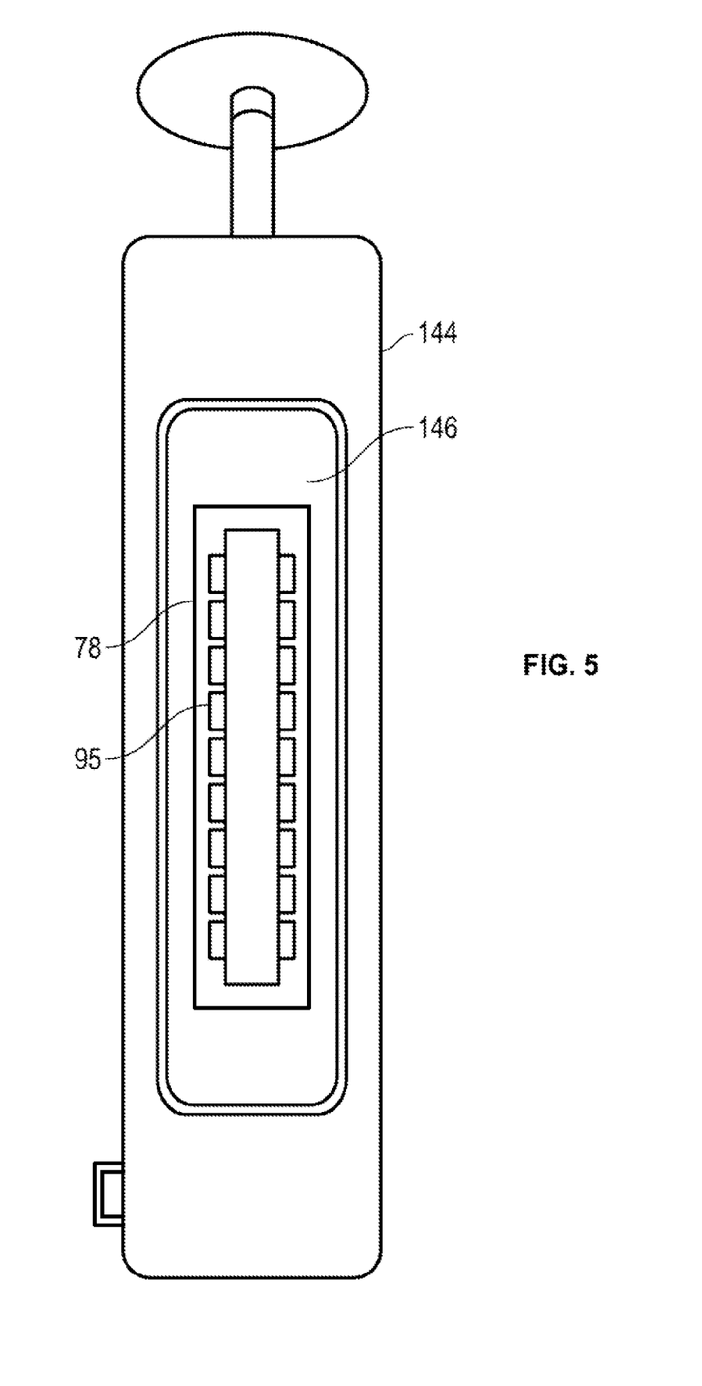
FIG. 5 is an axial view of the vehicle interior component of FIG. 4 illustrating a docking port for receiving a sleeve and a smartphone.

FIG. 5 is an axial view of sun visor 144. This axial view illustrates interior portion of recess 146. Smartphone interface port 95 is visible extending axially from a rear portion of recess 146. A smartphone positioned within recess 146 in a bottom-first orientation will engage smartphone interface port 95 and will thereby be communicatively coupled with hardware module 78. A smartphone having dimensions that are smaller than the dimensions of recess 146 would be loosely received within recess 146 and, depending upon its dimensions, may rattle against the walls defining recess 146 during normal vehicle operations. To ensure a stable and secure engagement between recess 146 and the smartphone, the smartphone will be housed in a sleeve and the sleeve will be placed in recess 146. The sleeve will be configured to securely receive the smartphone and also to be securely received within recess 146. Different sized sleeves will be made available to accommodate different sized smartphones. The exterior dimensions of each differently sized sleeve, however, will remain constant to conform to the dimensions of recess 146 while the dimensions of each sleeve's recess will be designed to conform to a specific size of smartphone. In this manner, by using a sleeve to mount the smartphone within recess 146, the dimensions of each recess 146 of each vehicle interior component may be kept constant and will thereby simplify the manufacturing process of such vehicle interior components.

Figure 6:
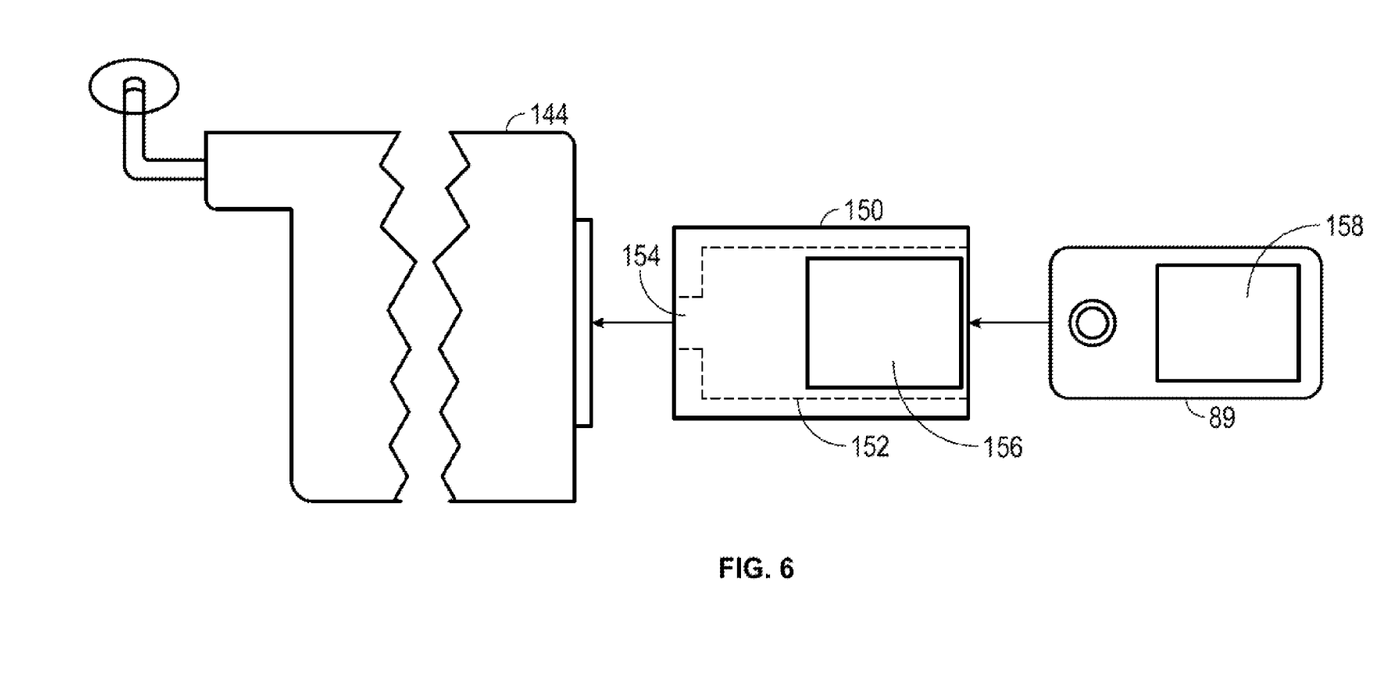
FIG. 6 is an exploded, fragmentary view illustrating a smartphone, a sleeve, and the vehicle interior component of FIG. 4.

FIG. 6 is an exploded, fragmentary view illustrating smartphone 89, a sleeve 150, and a sun visor 144. As illustrated, sleeve 150 includes a recess 152, illustrated in phantom lines, that is configured to conform to the dimensions and contours of smartphone 89. With continuing reference to FIGS. 2-5, an access passageway 154 is positioned at a rear portion of sleeve 150 to permit engagement between a communication port on smartphone 89 and smartphone interface port 95. Access passageway 154 permits engagement between smartphone 89 and smartphone interface port 95 without obstruction. Sleeve 150 further includes a window 156 to permit visual access to a view screen 158 of smartphone 89. When smartphone 89 is positioned within recess 152, and when sleeve 150 is positioned within recess 146, windows 148 and 156 will align over view screen 158 to permit a human operator to visually access view screen 158.

Figure 7:
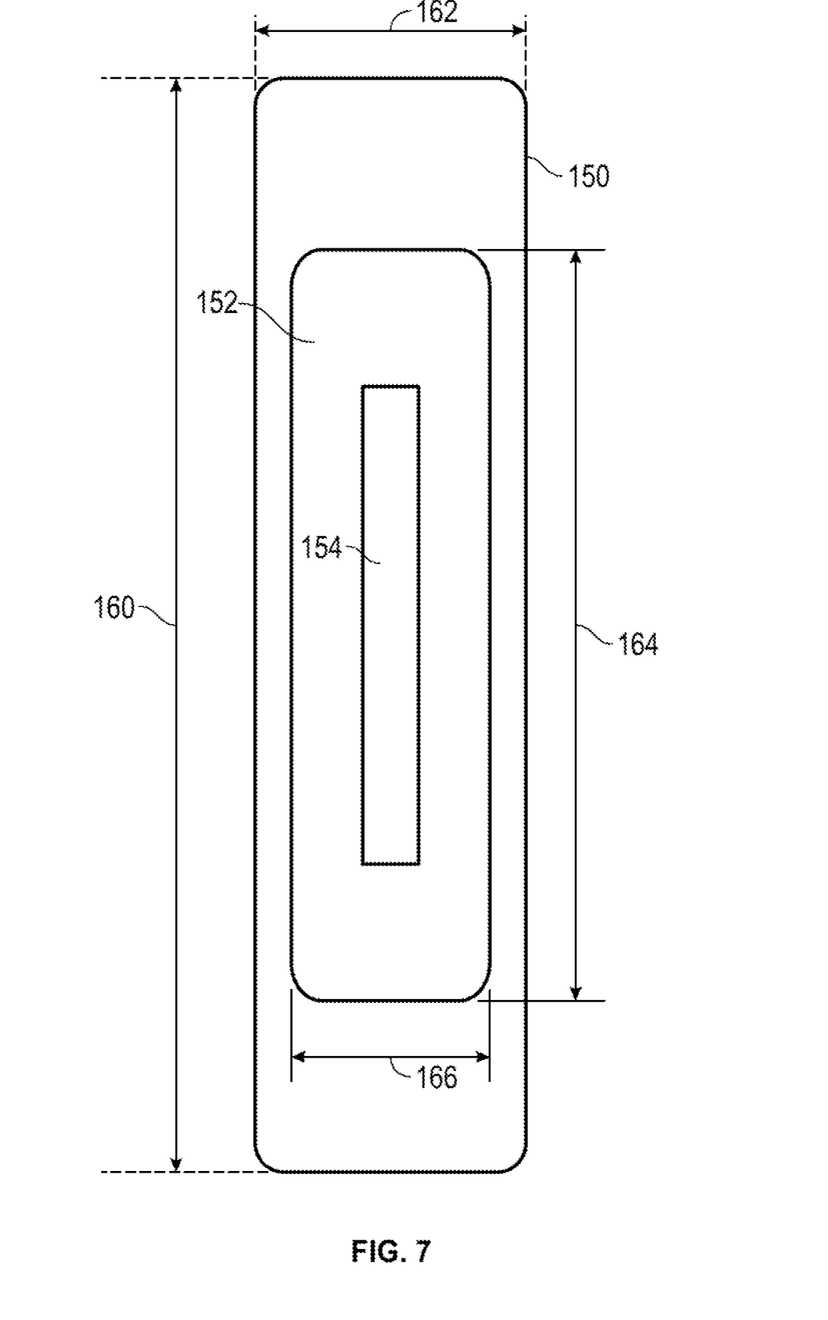
FIG. 7 is an axial view of the sleeve of FIG. 6.

FIG. 7 is an axial view of sleeve 150. With continuing reference to FIGS. 2-6, sleeve 150 has an outer width dimension 160 and an outer depth dimension 162 that corresponds with width and depth dimensions, respectively, of recess 146 and accordingly will fit snugly within recess 146 when inserted. Sleeve 150 has an inner width dimension 164 and an outer width dimension 166 that corresponds with the width and depth of smartphone 89 and accordingly smartphone 89 will fit snugly within recess 152 when inserted.

Figure 8:
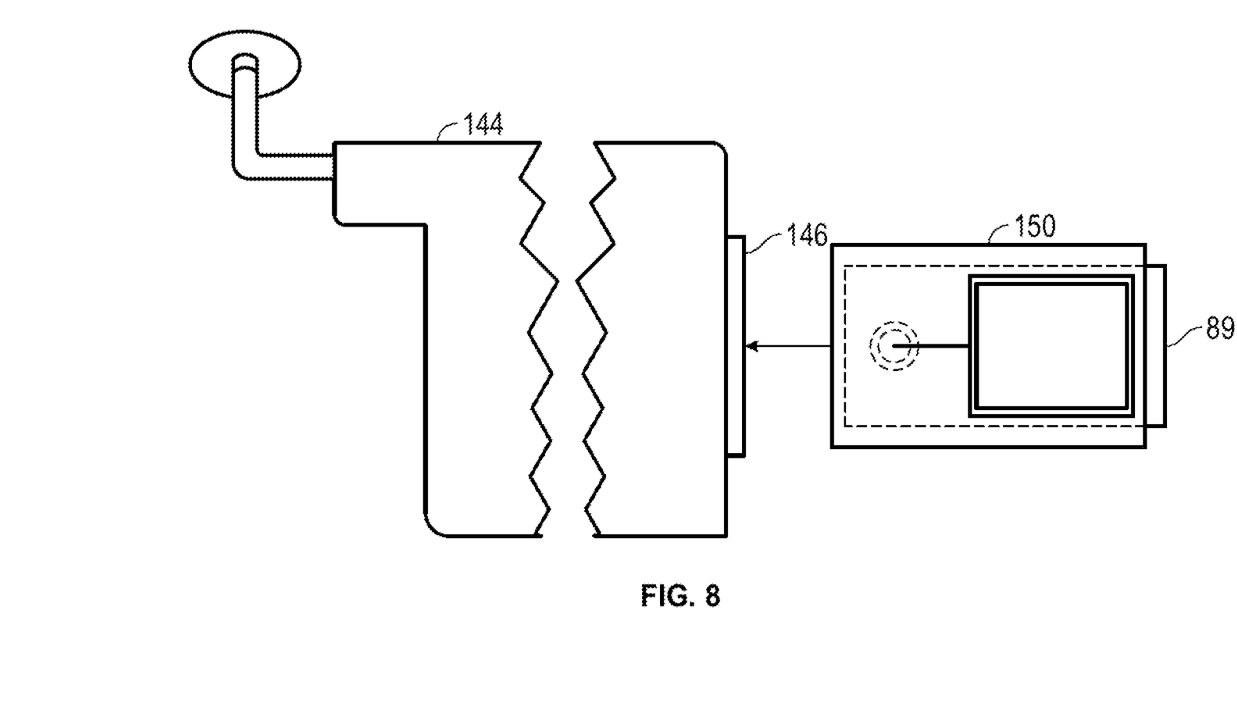
FIG. 8 is a partially exploded view illustrating the smartphone of FIG. 6 nested within the sleeve of FIG. 6 prior to docking with the vehicle interior component of FIG. 4.

FIG. 8 is a partially exploded view illustrating smartphone 89 snugly received within sleeve 150 as sleeve 150 and smartphone 89 are about to be inserted into recess 146 of sun visor 144.

Figure 9:
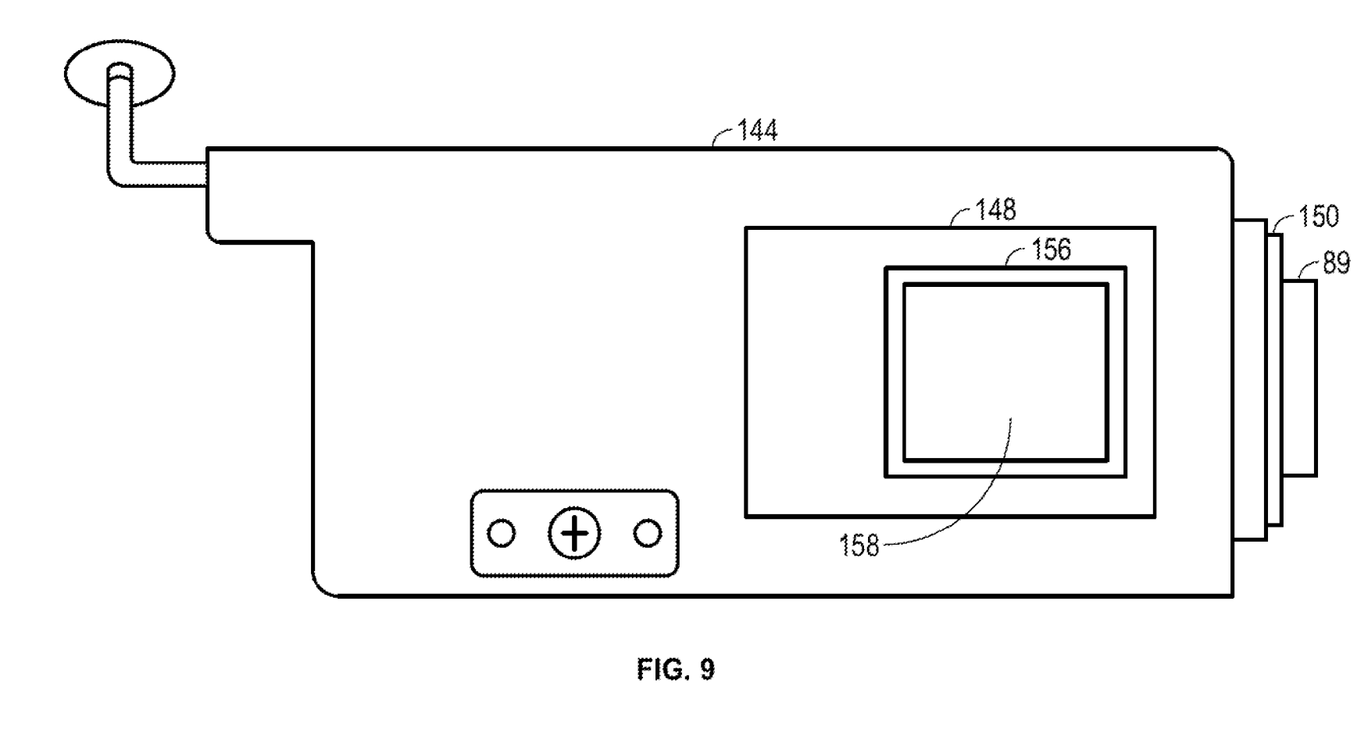
FIG. 9 is a view illustrating the smartphone and the sleeve of FIG. 6 docked with the vehicle interior component of FIG. 4.

FIG. 9 is a view illustrating smartphone 89 and sleeve 150 docked within sun visor 144. When docked, window 148 and window 156 alignment to enable the human operator to visually access view screen 158.

Figure 10:
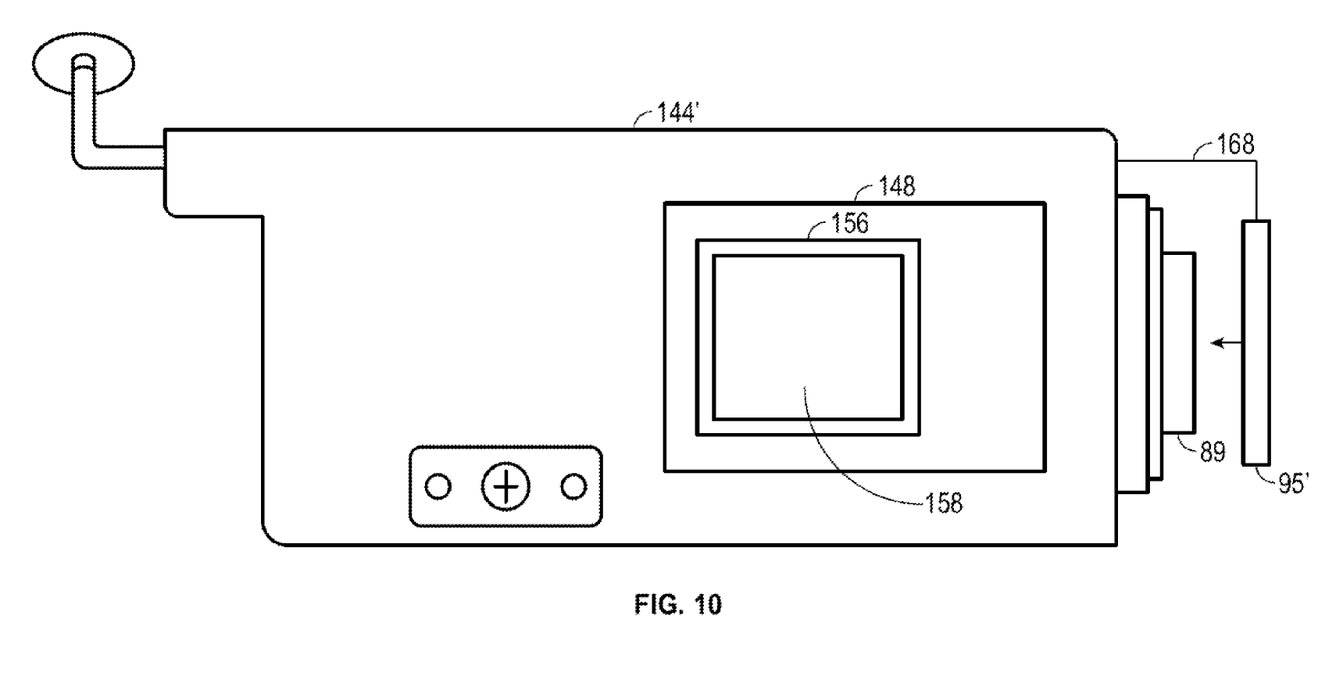
FIG. 10 is a view of an alternate example of a vehicle interior component made in accordance with the teachings of the present disclosure.

FIG. 10 is a view of an alternate example 144' of a sun visor made in accordance with the teachings of the present disclosure. In this view, the sun visor is configured to permit insertion of smartphone 89 in a screen first orientation. When inserted in this manner, the access port of smartphone 89 faces outwardly from the sun visor. To accommodate this, a smartphone interface port 95' is configured to engage the outwardly projecting access port smartphone 89. With continuing reference to FIGS. 2-9, a wire 168 communicatively couples smartphone interface port 95' with hardware module 78.

While at least one exemplary example has been presented in the foregoing detailed description, it should be appreciated that a vast number of variations exist. It should also be appreciated that the example or examples disclosed herein are not intended to limit the scope, applicability, or configuration in any way. Rather, the foregoing detailed description will provide those skilled in the art with a convenient road map for implementing the example(s). It should be understood that various changes can be made in the function and arrangement of elements without departing from the scope as set forth in the appended claims and the legal equivalents thereof.

What is claimed is:

1. An vehicle interior component for supporting a communication system, the vehicle interior component comprising:
    a body adapted for attachment to an interior of a vehicle and configured to receive a smartphone, the body comprising a sun visor assembly;
    a hardware module configured to communicatively couple with the smartphone when the smartphone is received by the body; and
    a user input module communicatively coupled with the hardware module, the user input module configured to generate a first input signal in response to a first user input and to transmit the first input signal to the hardware module,
    wherein the hardware module is further configured to generate a first output signal and to transmit the first output signal to the smartphone in response to receiving the first input signal.

2. The vehicle interior component of claim 1, wherein the hardware module comprises a processor.

3. The vehicle interior component of claim 2, wherein the hardware module further comprises an electronic memory unit operatively coupled with the processor, the electronic memory unit configured to store data associated with a plurality of output signals and wherein the processor is configured to retrieve a datum from the data in response to receiving an input signal, the datum corresponding with an output signal that corresponds with the input signal, the processor further configured to utilize the datum to generate the output signal.

4. The vehicle interior component of claim 1, further comprising a microphone connected to the body and communicatively coupled with the hardware module, the microphone configured to detect sound energy, to generate a second input signal in response to detecting the sound energy, and to transmit the second input signal to the hardware module when the sound energy is detected and wherein the hardware module is configured to generate a second output signal and to transmit the second output signal to the smartphone in response to receiving the second input signal.

5. The vehicle interior component of claim 1, further comprising a speaker connected to the body and communicatively coupled with the hardware module, and wherein the hardware module is further configured to generate and transmit a second output signal to the speaker in response to receiving a second input signal from the smartphone, and wherein the speaker is configured to produce an audible output in response to receiving the second output signal from the hardware module.

6. The vehicle interior component of claim 1, wherein the body is configured to receive the smartphone such that a docking end of the smartphone faces towards the body.

7. The vehicle interior component of claim 1, wherein the body is configured to receive the smartphone such that a docking end of the smartphone faces away from the body.

8. The vehicle interior component of claim 1, further comprising an orientation sensor communicatively coupled with the hardware module, the orientation sensor configured to generate a second input signal corresponding with an orientation of the body and further configured to transmit the second input signal to the hardware module and wherein the hardware module is configured to generate and transmit a second output signal to the smartphone in response to receiving the second input signal.

9. An vehicle interior component for supporting a communication system, the vehicle interior component comprising:
    a body adapted for attachment to an interior of a vehicle and configured to receive a smartphone, the body comprising a sun visor assembly;
    a hardware module configured to communicatively couple with the smartphone when the smartphone is received by the body;
    a user input module communicatively coupled with the hardware module, the user input module configured to generate a first input signal in response to a first user input and to transmit the first input signal to the hardware module; and a vehicle bus communication module communicatively coupled with the hardware module and configured to communicatively couple with a vehicle bus of the vehicle and further configured to communicatively interface between the hardware module and the vehicle bus, wherein the hardware module is further configured to generate a first output signal and to transmit the first output signal to the smartphone in response to receiving the first input signal.

10. The vehicle interior component of claim 9, wherein the hardware module is further configured to instruct the vehicle bus communication module to communicate over the vehicle bus in response to the hardware module receiving an interrogation from the smartphone and wherein the hardware module is still further configured to transmit a responsive message to the smartphone in response to receiving the responsive message from the vehicle bus communication module.

11. The vehicle interior component of claim 9, wherein the hardware module comprises a processor.

12. The vehicle interior component of claim 11, wherein the hardware module further comprises an electronic memory unit operatively coupled with the processor, the electronic memory unit configured to store data associated with a plurality of output signals and wherein the processor is configured to retrieve a datum from the data in response to receiving an input signal, the datum corresponding with an output signal that corresponds with the input signal and further configured to utilize the datum to generate the output signal.

13. A vehicle interior component for supporting a communication system, the vehicle interior component comprising:

a sleeve configured to receive a smartphone;

a body adapted for attachment to an interior of a vehicle and configured to receive the sleeve, the body comprising a sun visor assembly;

a hardware module configured to communicatively couple with the smartphone when the smartphone is received by the sleeve and when the sleeve is received by the body; and a user input module communicatively coupled with the hardware module, the user input module configured to generate a first input signal in response to a first user input and to transmit the first input signal to the hardware module, wherein the hardware module is further configured to generate a first output signal and to transmit the first output signal to the smartphone in response to receiving the first input signal.

14. The vehicle interior component of claim 13, wherein the hardware module comprises a processor.

15. The vehicle interior component of claim 14, wherein the hardware module further comprises an electronic memory unit operatively coupled with the processor, the electronic memory unit configured to store a plurality of output signals and wherein the processor is configured to retrieve an output signal from the plurality of output signals stored in the electronic memory unit in response to receiving an input signal, the output signal corresponding with the input signal.

16. The vehicle interior component of claim 13, wherein the body is configured to receive the smartphone such that a docking end of the smartphone faces towards the body.

17. The vehicle interior component of claim 13, wherein the body is configured to receive the smartphone such that a docking end of the smartphone faces away from the body.

* * * * *